(12) United States Patent
Hessling et al.

(10) Patent No.: US 7,059,568 B2
(45) Date of Patent: Jun. 13, 2006

(54) PANEL FOR A VEHICLE

(75) Inventors: André Hessling, Lippstadt (DE); Bodo Wisch, Bremen (DE)

(73) Assignee: Goodrich Hella Aerospace Lighting Systems GmbH, Lippstadt (DE)

( * ) Notice: Subject to any disclaimer, the term of this patent is extended or adjusted under 35 U.S.C. 154(b) by 240 days.

(21) Appl. No.: 10/207,273

(22) Filed: Jul. 30, 2002

(65) Prior Publication Data

US 2005/0072879 A1 Apr. 7, 2005

Related U.S. Application Data

(60) Provisional application No. 60/365,543, filed on Mar. 20, 2002.

(30) Foreign Application Priority Data

Jul. 30, 2001 (DE) ................................. 101 36 917

(51) Int. Cl.
*B64C 1/00* (2006.01)

(52) U.S. Cl. .................... 244/129.1; 244/131; 296/211; 296/214; 403/341; 403/335; 403/375

(58) Field of Classification Search ............. 244/129.1, 244/131; 296/210, 211, 214, 218, 224; 403/341, 403/335, 375
See application file for complete search history.

(56) References Cited

U.S. PATENT DOCUMENTS

| 4,425,001 | A | * | 1/1984 | Mauri | ........................ 296/178 |
| 4,457,249 | A | * | 7/1984 | Disen | ........................... 114/88 |
| 6,550,852 | B1 | * | 4/2003 | Patz et al. | ................... 296/211 |
| 2002/0089185 | A1 | | 7/2002 | Hessling et al. | |

FOREIGN PATENT DOCUMENTS

| DE | 4445249 C1 | 3/1996 |
| DE | 197 30 269 A1 | 1/1999 |
| DE | 199 00 267 A1 | 7/2000 |
| EP | 1 215 082 A2 | 12/2001 |
| WO | WO 00/40436 A2 | 7/2000 |

* cited by examiner

*Primary Examiner*—J. Woodrow Eldred
(74) *Attorney, Agent, or Firm*—Bitch Stewart Kolasch & Birch LLP

(57) ABSTRACT

The invention relates to a device for fastening an in-fill panel element to a plane panel element of a covering for an aircraft, the in-fill panel element and the panel element being releasably interconnected at longitudinal sides facing each other, a transverse pin being arranged at least in the end portion of a longitudinal side so that a hook element arranged in the corresponding end portion of the other longitudinal side is able to clampingly engage with a hook opening, in such a manner that a covering surface of the in-fill panel element is arranged so as to be even with a covering surface of the panel element.

18 Claims, 3 Drawing Sheets

PANEL FOR A VEHICLE

This nonprovisional application claims priority to U.S. Provisional Application 60/365,543, which was filed on Mar. 20, 2002, and to German Patent Application No. DE 101 36 917.4, which was filed in Germany on Jul. 30, 2001.

BACKGROUND OF THE INVENTION

1. Field of the Invention

The present invention relates to a panel for a vehicle, particularly for the interior of a vehicle, the vehicle preferably being an aircraft.

2. Description of the Background Art

For the covering of vehicles, particularly the inside of vehicles such as airplanes, covering or panel elements (mostly of plastics) are used which are fastened to holding structures of the vehicle. The covering elements are fastened, for example, to rails above the seats in an airplane by particular fastening elements arranged at the covering elements. Above the seats, there are several different covering elements and covering units including, for example, breathing masks, reading lights, air nozzles, information displays and key buttons, or other operating elements, such as PSU units (passenger service unit).

Per seat row, the afore-mentioned covering elements or covering units are located above the seats. Between these covering units, depending on the distance between the seat rows, further covering elements, also called in-fill panels, are located. These covering elements are comparably lightweight and, for reasons of simplicity, they partly do not have fastening systems of their own for being directly fastened to the holding structure of the vehicle to which the other covering elements or units are fastened. In the prior art, for example, it is known to fasten these in-fill panels, by particular clamps, to a covering element that, in turn, is mounted on the holding structure of the vehicle via fastening elements. A certain disadvantage of the known covering elements fastened by clamps or the like is that these covering elements may loosen accidentally because of vibrations, for example, or because forces are applied upon them by the passenger during loading of luggage or sitting, which result in the detachment of the covering element.

SUMMARY OF THE INVENTION

It is therefore an object of the invention to provide an improved fastening of a covering element for an airplane to an adjacent covering element.

In order to solve this object, the invention provides a covering for an airplane, particularly for the interior of a vehicle and preferably for an airplane, which is provided with a first covering element having two transverse sides and two longitudinal sides. The first covering element including a covering wall with a front side as well as a rear side, and a holding-down element being arranged at the rear side of the covering wall. A second covering element is also provided with an abutting side for abutting on the one longitudinal side of the first covering element.

According to a preferred embodiment of the present invention, the second covering element includes a hook element for encompassing the longitudinal side of the first covering element and for engaging under the holding-down element of the first covering element.

The (second) covering element, which does not have any fastening element of its own for being fastened to a holding structure of the vehicle, is connected to the first covering element that includes fastening elements for being fastened to the holding structure. The hook element encompasses the longitudinal side of the first covering element, which usually stands up, and engages under a holding-down element. Thus, a safe coherence of the two covering elements is given by a kind of interlocking. This coherence is stable with respect to all relative movements of both covering elements and particularly with respect to relative movements of the covering elements directed along an axis extending at right angles to the covering walls of the covering elements.

Suitably, the first covering element comprises several holding points for being fixed to the second covering element. According to the invention, however, it is only required that at least one of the holding points is configured in the way of the above-described hook element that cooperates with the longitudinal side and the holding-down element of an adjacent second covering element. The other holding points need not necessarily be configured as hook elements. Clamps or other connection techniques, for example, are sufficient. It is suitable, however, when the second holding point is also configured as a hook element, and, in this case, it is particularly advantageous if the two hook elements point into opposite directions with their hook openings and respectively engage under holding-down elements.

It is advantageous if the holding-down elements of the first covering element provided with fastening elements need not be provided separately for being coupled by a second covering element. It is advantageous, for example, if a projection or the like provided for different purposes at the first covering element can be used for being engaged under by the hook element.

It is advantageous to use the axle pins provided at covering elements according to DE-A-197 30 269, EP-A-1 215 082 and WO-A-00/40436 as holding-down elements. In these known (first) covering elements, the axle pins serve for pivotally supporting fastening elements snapping into C-shaped holding rails of the vehicle and being fastened there.

In the case of the afore-mentioned first covering elements or covering elements of the first type, the hook element of the covering element of the second type can engage under the axle pin usually freely accessible at both sides of the fastening element. Thus, no separate element exerting the function of the holding-down element is required for the covering element of the first type, which is advantageous with respect to the reduction of weight and the production of the covering element of the first type.

In an advantageous embodiment of the invention, each hook element includes abutting sections, which not only engage under the holding-down element, but also over it. Thus the holding-down element is encompassed between the abutting sections of a hook element. Thereby, a still greater coherence of a covering element of the first type with a covering element of the second type is guaranteed according to the invention.

According to a modification of the present invention, there is provided a device for fastening an in-fill covering element to a covering element of an inside covering for a vehicle, particularly aircraft. The in-fill covering element and the covering element are adapted to be releasably interconnected at longitudinal sides facing each other.

This modification is characterized in that at least in the end portion of the longitudinal side of the covering element or—alternatively—the longitudinal side of the in-fill covering element, a holding-down element is arranged with which a hook element with a hook opening, arranged in the end portion of the longitudinal side of the in-fill covering element or—alternatively—the longitudinal side of the covering element, is able to clampingly engage in such a manner that a covering wall of the in-fill covering element is arranged so as to be even with a covering wall of the covering element.

In this case, it is advantageous when the holding-down element and the hook element are arranged in respectively opposed end portions of the covering elements, the holding-down element being positioned at the one longitudinal side and the hook element being positioned at the other longitudinal side.

Preferably, the holding-down element is configured as an axle pin which is arranged at the longitudinal side of the covering element and on which a fastening element for fastening the covering element to the vehicle is pivotally supported.

In particular, the hook element is integrally connected with a bridge section projecting transversely to the longitudinal side of the in-fill covering element, the hook element and its hook opening being arranged at that side of the bridge section facing the covering wall.

The bridge section particularly projects from a base section that, in turn, is arranged in extension of the longitudinal side of the in-fill covering element.

The hook openings of the opposed hook elements are, for example, oriented oppositely and in parallel with the longitudinal side.

In an advantageous embodiment of the invention, it is provided that the hook opening is configured so as to taper outward in such a manner that the holding-down element, after being inserted and briefly reset into the hook opening, is arranged in press fit in the now attained mounting position to the hook element.

Particularly, the bridge section has a clamping nose extending in the direction of the covering wall, with the clamping nose being arranged at a distance to the base section, which corresponds to the thickness of the narrow edge of the one longitudinal side, and clampingly abutting on an inside of the covering element.

Preferably, the in-fill covering element is adapted to be manufactured as an integral injection molded part and/or the axle pin is made of a metallic material.

The invention has been described above with respect to two embodiments and modifications, respectively. The preferred configurations respectively presented with respect to the individual modifications can also be combined arbitrarily among the modifications. This means that an embodiment described in connection with the one modification according to the invention can also be combined with embodiments of the other modifications according to the invention.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
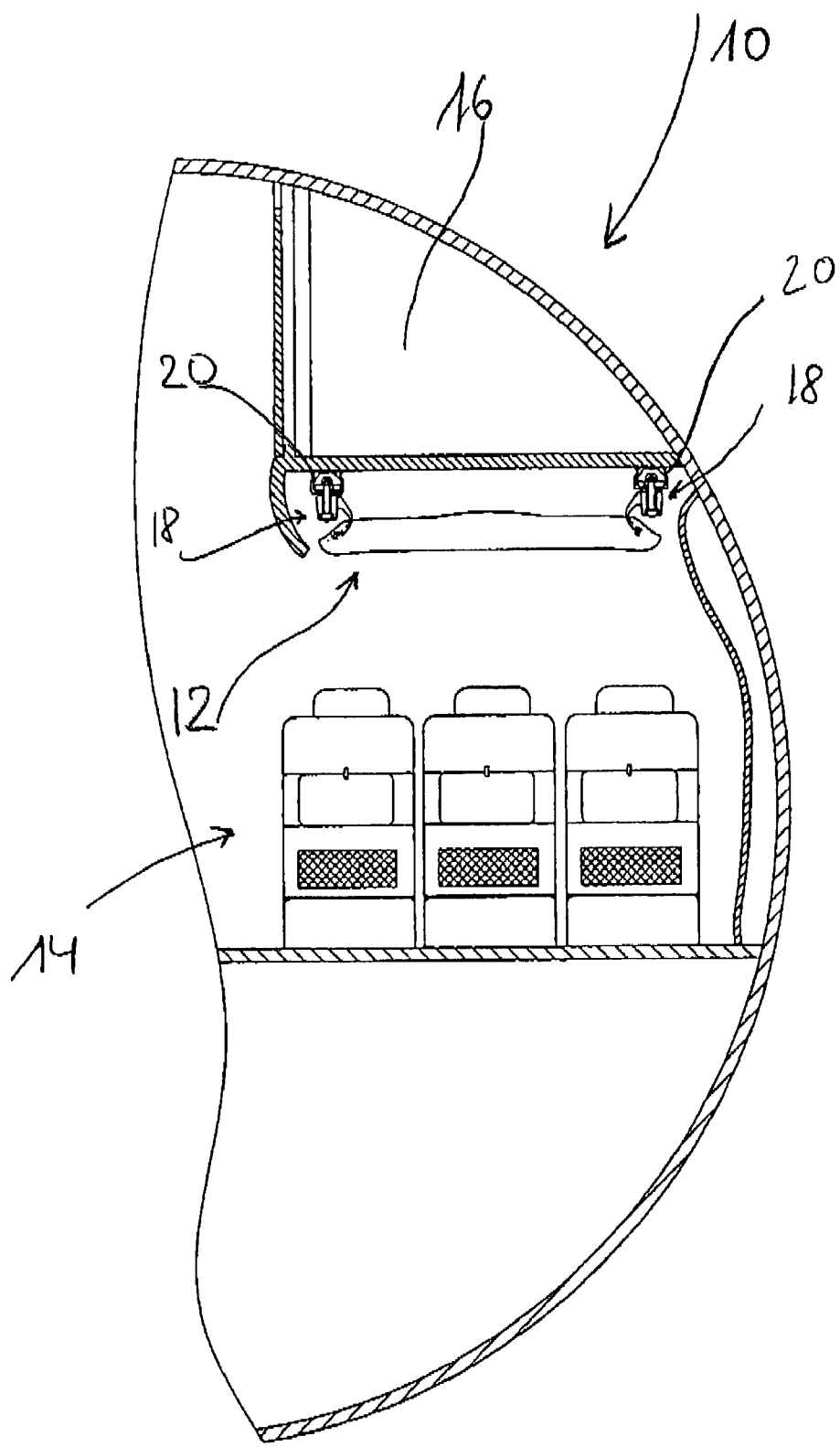
FIG. 1 is a partially sectioned view of a cabin of an airplane, illustrating attachment of covering elements above airplane seats.

FIG. 1 shows a partial cross section through an airplane cabin 10 provided with a covering according to the invention or a covering element according to the invention and according to an embodiment described herein. As can be seen from FIG. 1, the covering 12 is arranged above the seat rows 14, and below the luggage rack compartments 16. The individual elements of the covering 12 have different sizes and equipments. Those covering elements in which reading lights, ventilation nozzles, key buttons or breathing masks are integrated, for example (also called first covering elements or covering elements of the first type), are fastened to C-shaped holding profiles 20 via particular fastening elements 18, whereas light-weighted small and narrow covering elements (referred to as second covering elements or covering elements of the second type) are attached to a first covering element, respectively, which means that they themselves are not in direct connection with the C-shaped holding profiles 20.

Figure 2:
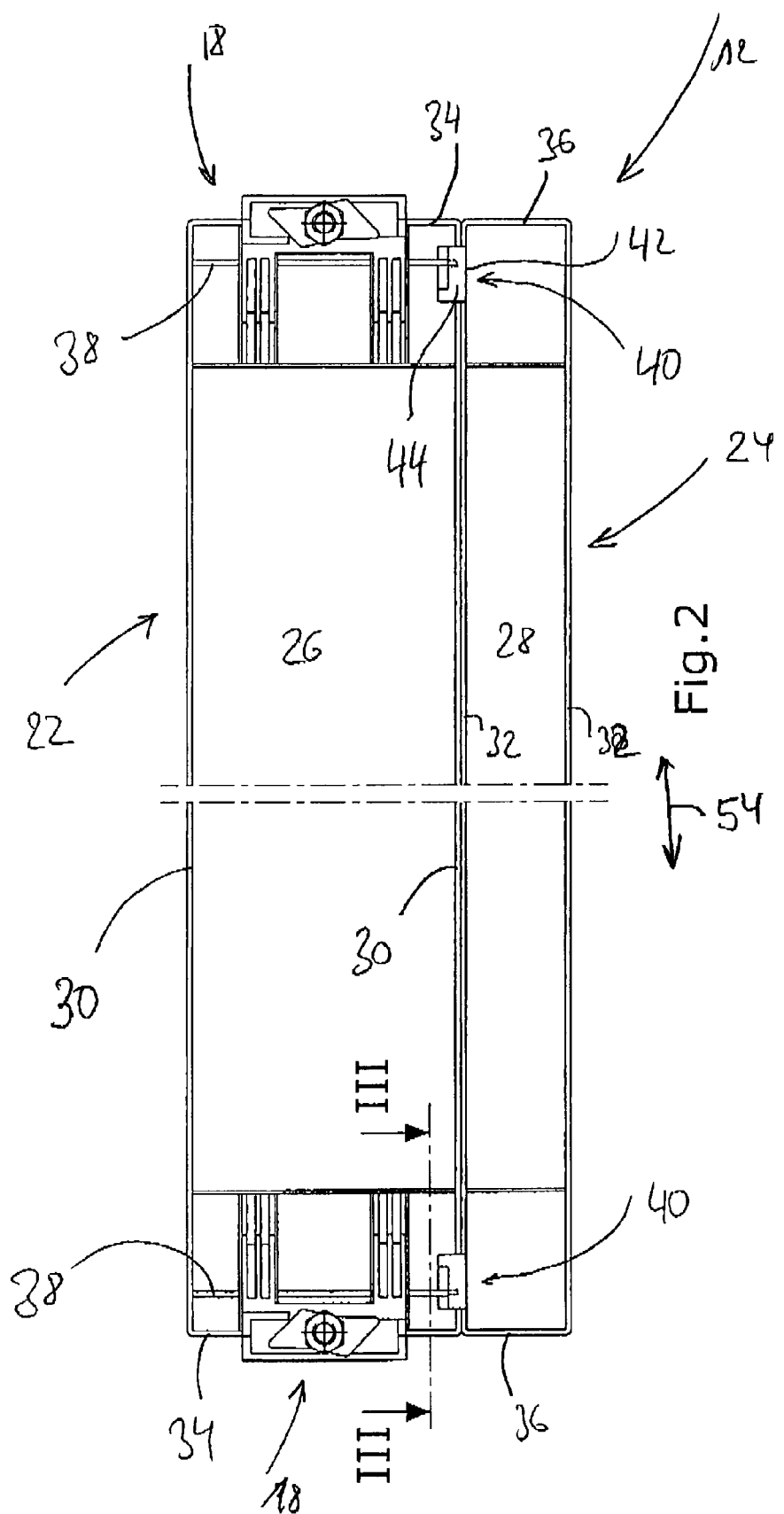
FIG. 2 is a top view of the rear side of two covering elements coupled with each other according to the invention, said rear side being invisible in the installed condition.

Two combined first and second covering elements 22,24 are shown in FIG. 2. FIG. 2 represents the view of its rear side facing away from the passengers.

Each of the two covering elements comprises a covering wall 26,28 surrounded by a peripheral upright lateral edge. This lateral edge extends along two longitudinal sides 30,32 as well as along two transverse sides 34,36. The first covering element 22 is provided with two fastening elements 18 supported on the first covering element 22 so as to be able to be pivoted about one axle pin 38, respectively. Preferably, the two axle pins 38 are made of metal and are arranged so as to extend in parallel with the transverse sides 34 as well as at right angles to the longitudinal sides 30. The two axle pins 38 are located near the opposed ends at the transverse sides 34 of the first covering element 22, which is preferably made of plastic. Usually, the second covering element 24 is also made of plastic.

As can be seen from FIG. 2, the two covering elements 22,24 are in mutual abutment with one of their longitudinal sides 30,32, respectively. In this respect, the respective longitudinal side 32 of the second covering element 24 is the abutting side thereof with which it abuts on the first covering element 22. At this abutting side 32, two hook elements 40 are located which are arranged near the transition area of the abutting side 32 to the transverse sides 36 of the second covering element 24. Each hook element 40 comprises a base section 42 formed in extension of the upright edge of the abutting side 32. The base section transitioning into a bridge section 44 extends transversely to the base section 42. From above, the bridge section 44 abuts on the upright edge of the longitudinal side 30 of the first covering element 22 on which, in turn, the abutting side 32 of the second covering element 24 abuts.

Figure 3:
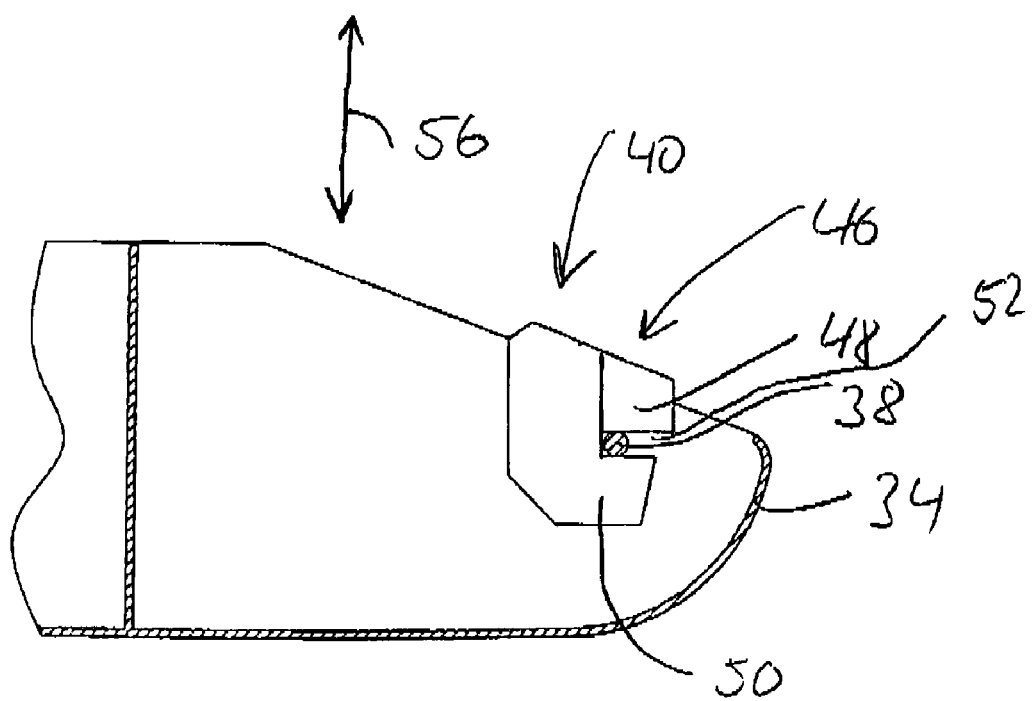
FIG. 3 shows a view along the line III—III of FIG. 2.

A hook section 46 comprising a first abutting section 48 as well as a L-shaped second abutting section 50 extends downward from the bridge section 44, i.e. parallel to the base section 42. Between the two abutting sections 48,50, a (hook) opening 52 is provided which is formed by a corresponding distance of the edges of the two abutting sections 48,50 facing each other. In this opening 52, the axle pin 38 is immerged. Since this kind of respectively engaging over and under the axle pins 38 is effected at both front ends of the first covering element, the second covering element 24 is secured against movements in the direction of the double arrow 54 of FIG. 2. Due to the condition that the hook elements 40 of the second covering element 24 encompass the longitudinal side 30 of the first covering element 22 and engage under the axle pins 38 by the second abutting sections 50, the second covering element 24 is also held safely on the first covering element 22 with respect to relative movements which are directed transversely to the covering walls 26,28 (vertical to the drawing plane according to FIG. 2 or refer to double arrow 56 according to FIG. 3).

The drawing does not illustrate that the two covering elements 22,24 may be additionally held together by at least one clamp stuck on the upright lateral edges at the abutting longitudinal edges. In principle, such clamps are known in the prior art. They are usually made of metal and/or plastics and are held at the lateral edges in frictional and/or positive engagement.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A covering for a vehicle comprising:
   a first covering element having two transverse sides and two longitudinal sides, the first covering element comprising a covering wall with a front side as well as a rear side, and a holding-down element being arranged at the rear side of the covering wall, and
   a second covering element with an abutting side for abutting on one of the two longitudinal sides of the first covering element,
   wherein the holding-down element is an axle pin, which is arranged in a corner portion of a transverse side and a longitudinal side of the first covering element, and on which a fastening element for fastening the first covering element to the vehicle is pivotally supported,
   wherein the second covering element comprises a hook element for engaging the longitudinal side of the first covering element and for engaging under the holding-down element of the first covering element, and
   wherein the second covering element is solely engaged at the longitudinal side of the first covering element.

2. The covering according to claim 1, wherein two holding-down elements are provided, which are arranged at opposed ends of the first covering element, and wherein the second covering element comprises two hook elements.

3. The covering according to claim 1, wherein each of the two covering elements comprises a lateral edge defining the respective covering wall, said lateral edges forming the longitudinal and transverse sides, and wherein the hook element engages the lateral edge of the first covering element.

4. The covering according to claim 1, wherein the first covering element comprises two fastening elements each of which is adapted to be pivoted about an axle pin and arranged in corner portions of a longitudinal side and the two adjacent transverse sides, and wherein the second covering element comprises two hook elements for encompassing the longitudinal side of the first covering element and for engaging under one axle pin, respectively.

5. The covering according to claim 1, wherein the hook element comprises abutting sections for abutting on a holding-down element within diametrically opposed portions of the holding-down element.

6. A device for fastening an in-fill covering element to a covering element of an inside covering for a vehicle, the in-fill covering element and the covering element being adapted to be releasably interconnected at longitudinal sides facing each other,
   wherein (a) at least in (1) an end portion of the longitudinal side of the covering element or (2) the longitudinal side of the in-fill covering element, a holding-down element is arranged with which a hook element with a hook opening, arranged in the end portion of the longitudinal side of the in-fill covering element or (b) the longitudinal side of the covering element, is able to clampingly engage in such a manner that a covering wall of the in-fill covering element is arranged so as to be even with a covering wall of the covering element,
   wherein the holding-down element is an axle pin which is arranged at the longitudinal side of the covering element and on which a fastening element for fastening the covering element to the vehicle is pivotally supported, and
   wherein the in-fill covering element is solely engaged with the longitudinal side of the covering element.

7. The device according to claim 6, wherein the holding-down element and the hook element are arranged in respectively opposed end portions of the covering elements, the holding-down element being positioned at the one longitudinal side and the hook element being positioned at the other longitudinal side.

8. The device according to claim 7, wherein the hook element is integrally connected with a bridge section projecting transversely to the longitudinal side of the in-fill covering element, the hook element and its hook opening being arranged at that side of the bridge section facing the covering wall.

9. The device according to claim 6, wherein a bridge section projects from a base section, which is arranged in extension of the longitudinal side of the in-fill covering element.

10. The device according to claim 6, wherein the hook openings of opposed hook elements are oriented oppositely and in parallel with the longitudinal side.

11. A device for fastening an in-fill covering element to a covering element of an inside covering for a vehicle, the in-fill covering element and the covering element being adapted to be releasably interconnected at longitudinal sides facing each other,
    wherein (a) at least in (1) an end portion of the longitudinal side of the covering element or (2) the longitudinal side of the in-fill covering element, a holding-down element is arranged with which a hook element with a hook opening, arranged in the end portion of the longitudinal side of the in-fill covering element or (b) the longitudinal side of the covering element, is able to clampingly engage in such a manner that a covering wall of the in-fill covering element is arranged so as to be even with a covering wall of the covering element,
    wherein the in-fill covering element is solely engaged with the longitudinal side of the covering element, and
    wherein the hook opening is configured so as to taper outward so that the holding-down element, after being inserted and briefly reset into the hook opening, is arranged in press fit in the now attained mounting position to the hook element.

12. The device according to claim 6, wherein the bridge section comprises a clamping nose extending in the direction of the covering wall, said clamping nose being arranged at a distance to the base section which corresponds to a thickness of an edge of the one longitudinal side, and clampingly abutting on an inside of the covering element.

13. The device according to claim 6, wherein the in-fill covering element is adapted to be manufactured as an integral injection molded part.

14. The device according to claim 6, wherein the axle pin is made of a metallic material.

15. The covering according to claim 1, wherein the cover is for an interior of the vehicle.

16. The covering according to claim 1, wherein the cover is an aircraft interior cover.

17. The device according to claim 6, wherein the vehicle is an aircraft.

18. The covering according to claim 1, wherein the hook element of the second covering element engages the longitudinal side of the first covering element by gripping around the longitudinal side of the first covering element.

* * * * *